(12) United States Patent
Sasaguri

(10) Patent No.: US 11,228,218 B2
(45) Date of Patent: Jan. 18, 2022

(54) STATOR, MOTOR AND AIR BLOWING DEVICE

(71) Applicant: NIDEC CORPORATION, Kyoto (JP)

(72) Inventor: Yoshitsugu Sasaguri, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 210 days.

(21) Appl. No.: 16/739,074

(22) Filed: Jan. 9, 2020

(65) Prior Publication Data

US 2020/0251948 A1 Aug. 6, 2020

(30) Foreign Application Priority Data

Jan. 31, 2019 (JP) .............................. JP2019-015897

(51) Int. Cl.
| | |
|---|---|
| *H02K 3/28* | (2006.01) |
| *F04D 29/40* | (2006.01) |
| *F04D 19/00* | (2006.01) |
| *H02K 3/38* | (2006.01) |

(52) U.S. Cl.
CPC ............. *H02K 3/28* (2013.01); *F04D 19/002* (2013.01); *F04D 29/403* (2013.01); *H02K 3/38* (2013.01)

(58) Field of Classification Search
CPC ... H02K 3/28; H02K 3/38; H02K 3/32; F04D 19/002; F04D 29/403
See application file for complete search history.

(56) References Cited

U.S. PATENT DOCUMENTS

| | | | | |
|---|---|---|---|---|
| 2,892,598 A | * | 6/1959 | Dudley | ..................... B66D 1/36 242/602.2 |
| 3,391,879 A | * | 7/1968 | Bus, Sr. | ................... B66D 1/36 242/602.2 |
| 3,480,229 A | * | 11/1969 | Franklin | ................... H01F 5/02 242/118.4 |
| 3,851,830 A | * | 12/1974 | Barthalon | ................. H01F 5/02 336/208 |
| 4,071,205 A | * | 1/1978 | Wieschel | ............. B65H 75/265 242/602.2 |
| 4,087,060 A | * | 5/1978 | Laky | .................. B65H 54/2803 242/399.1 |
| 4,988,055 A | * | 1/1991 | Sakai | ........................ H01F 5/02 242/159 |

(Continued)

FOREIGN PATENT DOCUMENTS

JP 2016174470 9/2016

*Primary Examiner* — Robert W Horn
(74) *Attorney, Agent, or Firm* — JCIPRNET

(57) ABSTRACT

A stator includes a stator core having a core back and a plurality of teeth, an insulator, and a coil formed by winding a conductive wire on an outer surface of the insulator to laminate a plurality of winding layers, wherein the insulator includes a cylindrical-shaped part with the conductive wire wound, a flange part provided at two ends of the cylindrical-shaped part and expanding in a lamination direction of the winding layers, and a contact part on the cylindrical-shaped part side of the flange part and contacting each of the winding layers in a winding direction; and the contact part includes a slope part inclined in the lamination direction of the winding layers with respect to a winding direction of the conductive wire and guiding the conductive wire from a winding end part of a certain winding layer to a winding start part of a subsequent winding layer.

12 Claims, 9 Drawing Sheets

(56) References Cited

U.S. PATENT DOCUMENTS

| | | | | |
|---|---|---|---|---|
| 6,369,483 B1* | 4/2002 | Hill | ............ | H02K 1/148 |
| | | | | 310/429 |
| 7,091,645 B2* | 8/2006 | Yoneda | ............ | H02K 3/18 |
| | | | | 29/605 |
| 7,906,879 B2* | 3/2011 | Jang | ............ | H02K 3/522 |
| | | | | 310/71 |
| 8,616,535 B2* | 12/2013 | Kon | ............ | F16F 13/26 |
| | | | | 267/140.14 |
| 9,455,606 B2* | 9/2016 | Ewert | ............ | H02K 3/345 |
| 9,722,466 B2* | 8/2017 | Tsuiki | ............ | H02K 3/345 |
| 10,014,741 B2* | 7/2018 | Lee | ............ | H02K 1/14 |
| 10,069,351 B2* | 9/2018 | Kageme | ............ | H02K 21/22 |
| 10,622,850 B2* | 4/2020 | Kong | ............ | H02K 1/272 |
| 11,005,314 B2* | 5/2021 | Kong | ............ | H02K 1/146 |
| 2008/0024030 A1* | 1/2008 | Saboi | ............ | H02K 3/522 |
| | | | | 310/208 |
| 2016/0111940 A1* | 4/2016 | Oyama | ............ | F04D 25/0646 |
| | | | | 417/423.7 |
| 2017/0133901 A1* | 5/2017 | Burch | ............ | H02K 3/345 |
| 2019/0020241 A1* | 1/2019 | Horii | ............ | H02K 1/16 |
| 2019/0044404 A1* | 2/2019 | Kim | ............ | H02K 5/22 |
| 2020/0235629 A1* | 7/2020 | Dolnicki | ............ | H02K 1/18 |
| 2020/0251948 A1* | 8/2020 | Sasaguri | ............ | H02K 3/38 |
| 2020/0251964 A1* | 8/2020 | Sasaguri | ............ | F04D 25/088 |
| 2020/0395806 A1* | 12/2020 | Kim | ............ | H02K 3/34 |
| 2021/0021171 A1* | 1/2021 | Hong | ............ | A47L 9/22 |
| 2021/0189628 A1* | 6/2021 | Choi | ............ | D06F 37/40 |

\* cited by examiner

STATOR, MOTOR AND AIR BLOWING DEVICE

CROSS REFERENCE TO RELATED APPLICATIONS

This application claims the priority benefit of Japanese application serial no. 2019-015897, filed on Jan. 31, 2019. The entirety of the above-mentioned patent application is hereby incorporated by reference herein and made a part of this specification.

BACKGROUND

Technical Field

The disclosure relates to a stator, a motor and an air blowing device.

Description of Related Art

A conventional armature often includes an insulator. The insulator may include a winding wound part around which an armature coil is wound, flange parts provided at two end parts of the winding wound part, and a step part in a step shape provided along inner surfaces of the flange parts at the two end parts of the winding wound part. The armature may be able to alleviate the tightening among the winding while improving the alignment of the winding of the armature coil.

However, in the conventional armature, when the outer diameter of the winding varies, there is a possibility that the timing of the return of the winding varies, and it is difficult to suppress the winding disorder at the winding return part.

SUMMARY

Solution to the Problem

An exemplary stator of the disclosure includes a stator core having a core back which is in a cylindrical shape extending vertically along a central axis and a plurality of teeth which extend from the core back in a radial direction; an insulator which covers at least a part of the teeth; and a coil which is formed by winding a conductive wire on an outer surface of the insulator to laminate a plurality of winding layers. The insulator includes a cylindrical-shaped part which is in a cylindrical shape with the conductive wire wound in a vertical direction and a circumferential direction of the teeth; a flange part which is provided at two ends of the cylindrical-shaped part across the coil in the radial direction and expands in a lamination direction of the winding layers; and a contact part which is on the cylindrical-shaped part side of the flange part and contacts each of the winding layers in the lamination direction. The contact part includes a slope part which is inclined in the lamination direction of the winding layers with respect to a winding direction of the conductive wire and guides the conductive wire from a winding end part of a certain one of the winding layers to a winding start part of a subsequent one of the winding layers.

The above and other elements, features, steps, characteristics and advantages of the present disclosure will become more apparent from the following detailed description of the preferred embodiments with reference to the attached drawings.

DESCRIPTION OF THE EMBODIMENTS

Hereinafter, exemplary embodiments of the disclosure will be described in detail with reference to the drawings. In this specification, a direction parallel to a central axis Cx of an air blowing device A is referred to as an "axial direction." Further, in the axial direction, a direction going from a stator core 21 toward bearings 3 is referred to as an "axial-direction upper side," and a direction going from the bearings 3 toward the stator core 21 is referred to as an "axial-direction lower side." Furthermore, regarding surfaces of each component, a surface facing the axial-direction upper side is referred to as an "upper surface," and a surface facing the axial-direction lower side is referred to as a "lower surface."

Further, a direction orthogonal to the central axis Cx is referred to as a "radial direction." Then, in the radial direction, a direction going toward the central axis Cx is referred to as a "radial-direction inner side," and a direction going away from the central axis Cx is referred to as a "radial-direction outer side." Furthermore, regarding side surfaces of each component, a surface facing the radial-direction inner side is referred to as an "inner side surface," and a surface facing the radial-direction outer side is referred to as an "outer side surface."

Further, a direction along an arc with the central axis Cx as the center is referred to as a "circumferential direction." In addition, the above-described names of directions and surfaces are used for description, and do not limit the positional relationships and directions of the air blowing device A and a motor 200 in use.

<1. Regarding the Air Blowing Device A>

Figure 1:
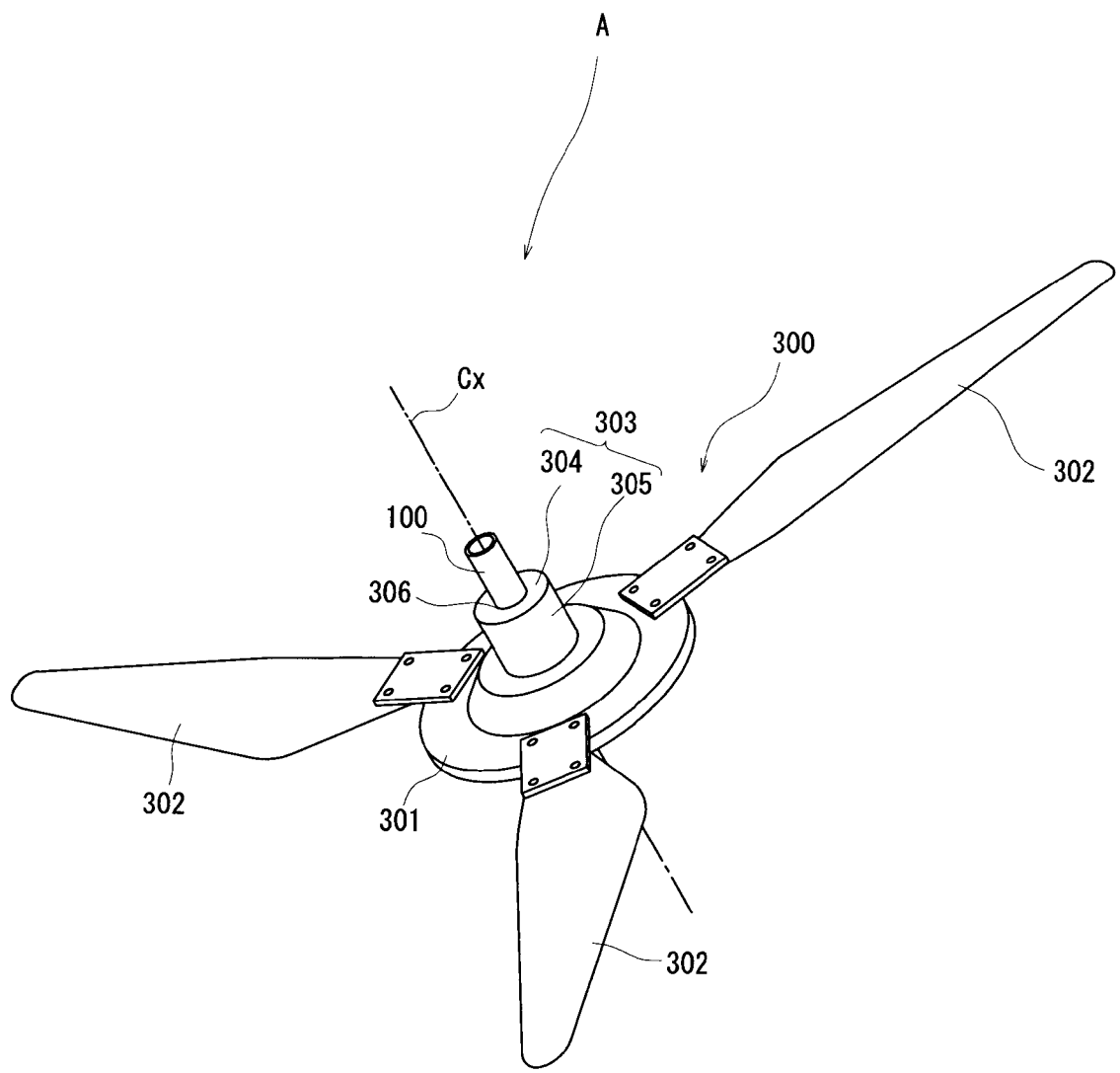
FIG. 1 is a perspective view showing an example of the air blowing device according to the disclosure.
Figure 2:
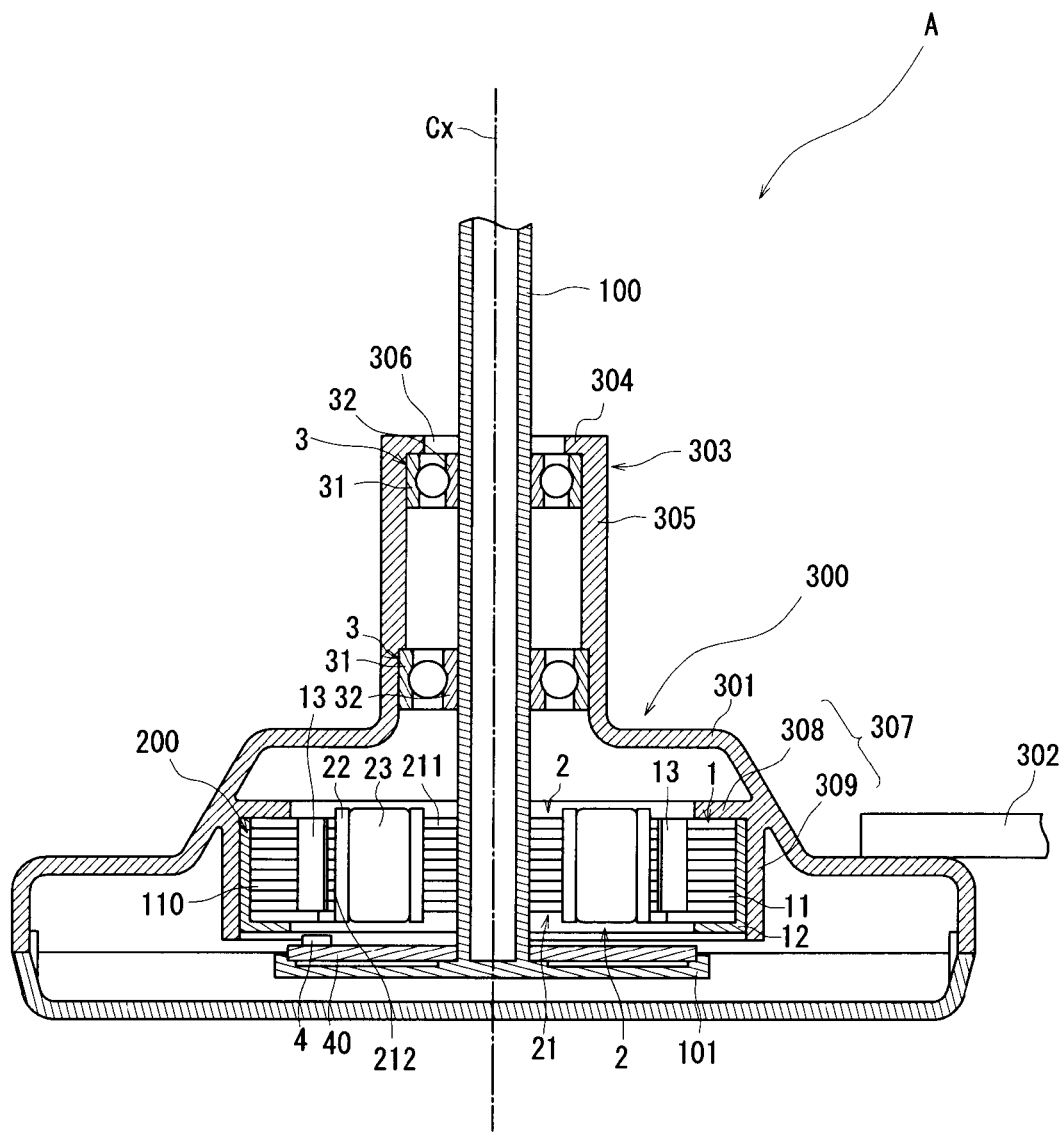
FIG. 2 is a longitudinal sectional view of the air blowing device shown in FIG. 1.

FIG. 1 is a perspective view showing an example of the air blowing device A according to the disclosure. FIG. 2 is a longitudinal sectional view of the air blowing device A shown in FIG. 1. As shown in FIG. 1 and FIG. 2, the air blowing device A according to the embodiment is a ceiling fan.

The air blowing device A includes a supporting column 100, the motor 200, and an impeller 300. The impeller 300 is attached to the supporting column 100 via the bearings 3 and is rotated by driving of the motor 200. The rotation of the impeller 300 generates an airflow going toward the axial-direction lower side. That is, the air blowing device A is an axial flow fan that generates an airflow from the axial-direction upper side to the lower side.

<2. Regarding the Supporting Column 100>

The supporting column 100 is disposed along the central axis Cx that extends vertically. The supporting column 100 is, for example, a member in a cylindrical shape configured by metal. A lead wire (not shown) connected to a circuit board 40 (to be described later) provided in the motor 200 is disposed in the inner part of the supporting column 100. In addition, the supporting column 100 may be configured by a material other than metal, such as ceramic or the like.

The supporting column 100 is fixed to the ceiling (not shown) of a living room. A base part 101 is provided on the axial-direction lower-side end part of the supporting column 100. The base part 101 expands in the radial direction and is disposed on the axial-direction lower-side end part of the supporting column 100. In addition, the base part 101 may be formed integrally with the supporting column 100 or may be configured to be attached to the supporting column 100. Further, the circuit board 40 is attached to the base part 101. A position detection part 4 is mounted on the upper surface of the circuit board 40.

<3. Regarding the Impeller 300>

As shown in FIG. 1 and FIG. 2, the impeller 300 includes an impeller housing 301 and a plurality of blades 302. The impeller 300 generates an airflow from the axial-direction upper side to the lower side. The impeller housing 301 is rotatably supported by the supporting column 100 via the bearings 3. Further, the impeller housing 301 has a space in the inner part, and a part of the supporting column 100 and the motor 200 are disposed in the inner part of the impeller housing 301.

The plurality of blades 302 are disposed on the upper surface of the impeller housing 301. The plurality of blades 302 are arranged in the circumferential direction. In the air blowing device A of the embodiment, the blades 302 are arranged on the upper surface of the impeller housing 301 at equal intervals. The impeller 300 of the embodiment includes three blades 302, but it is not limited thereto, and the impeller 300 may include four or more blades 302, or may include two or less blades 302.

The impeller housing 301 includes a bearing attachment part 303 on the axial-direction upper-side end part. The bearing attachment part 303 is rotatably attached to the supporting column 100 by two bearings 3 that are disposed apart in the axial direction. The bearing attachment part 303 is in a covered cylindrical shape. The bearing attachment part 303 includes a lid part 304 and a body part 305. The lid part 304 is provided on the axial-direction upper-side end part and expands in the radial direction. The body part 305 is in a cylindrical shape extending from the radial-direction outer edge of the lid part 304 toward the axial-direction lower side.

The lid part 304 includes, in a radial-direction central part, a through hole 306 penetrating in the axial direction. The supporting column 100 penetrates the through hole 306. The bearings 3 are disposed in the inner part of the bearing attachment part 303. In the embodiment, the bearings 3 are ball bearings. The supporting column 100 is fixed to inner rings 32 of the bearings 3. Outer rings 31 of the bearings 3 are fixed to the inner side surface of the body part 305. In this way, the impeller housing 301 is rotatably supported by the supporting column 100 via the bearings 3.

A rotor attachment part 307 in a covered cylindrical shape is provided in the inner part of the impeller housing 301. The rotor attachment part 307 is manufactured integrally with the impeller housing 301. The rotor attachment part 307 includes a rotor attachment lid part 308 and a rotor attachment cylinder part 309. The rotor attachment lid part 308 is in a circular plate shape that expands in a direction orthogonal to the central axis Cx on the axial-direction upper-side end part. The rotor attachment cylinder part 309 extends from the radial-direction outer-side edge part of the rotor attachment lid part 308 toward the axial-direction lower side. A rotor 1 is fixed to the rotor attachment part 307. More specifically, a rotor housing 12 (to be described later) including a rotor core 11, a rotor magnet 13 and a shield member 14 (to be described later) inside is fixed to the rotor attachment part 307.

<4. Regarding the Motor 200>

Next, a configuration of the motor 200 will be described. As shown in FIG. 2, the motor 200 includes the rotor 1, a stator 2, and the position detection part 4. The details of each part of the rotor 1, the stator 2, and the position detection part 4 are described below. The stator 2 of the motor 200 faces the inner circumferential surface of the rotor 1 in the radial direction.

That is, the motor 200 is an outer rotor type brushless motor.

<4.1 Regarding the Rotor 1>

As shown in FIG. 2, the rotor 1 includes the rotor core 11, the rotor housing 12 and the rotor magnet 13. The rotor magnet 13 has S poles or N poles alternately disposed in the circumferential direction. The position detection part 4 is disposed on the axial-direction lower side of the rotor magnet 13 and faces the rotor magnet 13 in the axial direction. Here, a linear Hall IC is adopted as the position detection part 4, but the disclosure is not limited thereto. A wide range of elements that can detect the rotational direction (that is, the circumferential-direction position) of the rotor 1 can be adopted as the position detection part 4.

The rotor core 11 surrounds the central axis Cx in a ring shape, and is configured by laminating a plurality of rotor pieces 110 made of electromagnetic steel plates or the like in the axial direction. The rotor core 11 is fixed by a fixing method such as caulking while overlapping the rotor pieces 110 in the axial direction. In this way, the rotor core 11 becomes a ring shape extending along the central axis Cx. The fixing of the rotor pieces 110 is not limited to caulking, and a fixing method such as adhesion or welding may be adopted. Further, the rotor core 11 is not limited to a laminated body, and may be a molded body formed by solidifying magnetic powder such as iron powder by sintering or the like.

The rotor core 11 is in a ring shape with the central axis Cx as the center. The rotor magnet 13 is disposed on the rotor core 11. The rotor housing 12 is a holding member that holds the rotor core 11 inside. The rotor housing 12 is in a cylindrical shape and contacts, in the axial direction, a part of the rotor core 11 on the radial-direction outer side of the rotor core 11. In this way, the rotor housing 12 holds the rotor core 11. In addition, the fixing method of the rotor housing 12 and the rotor core 11 may include, for example, press fitting, but it is not limited thereto. For example, a wide range of methods, such as adhesion or welding, that can fix the rotor housing 12 and the rotor core 11 can be adopted.

<4.2 Regarding the Stator 2>

Figure 3:
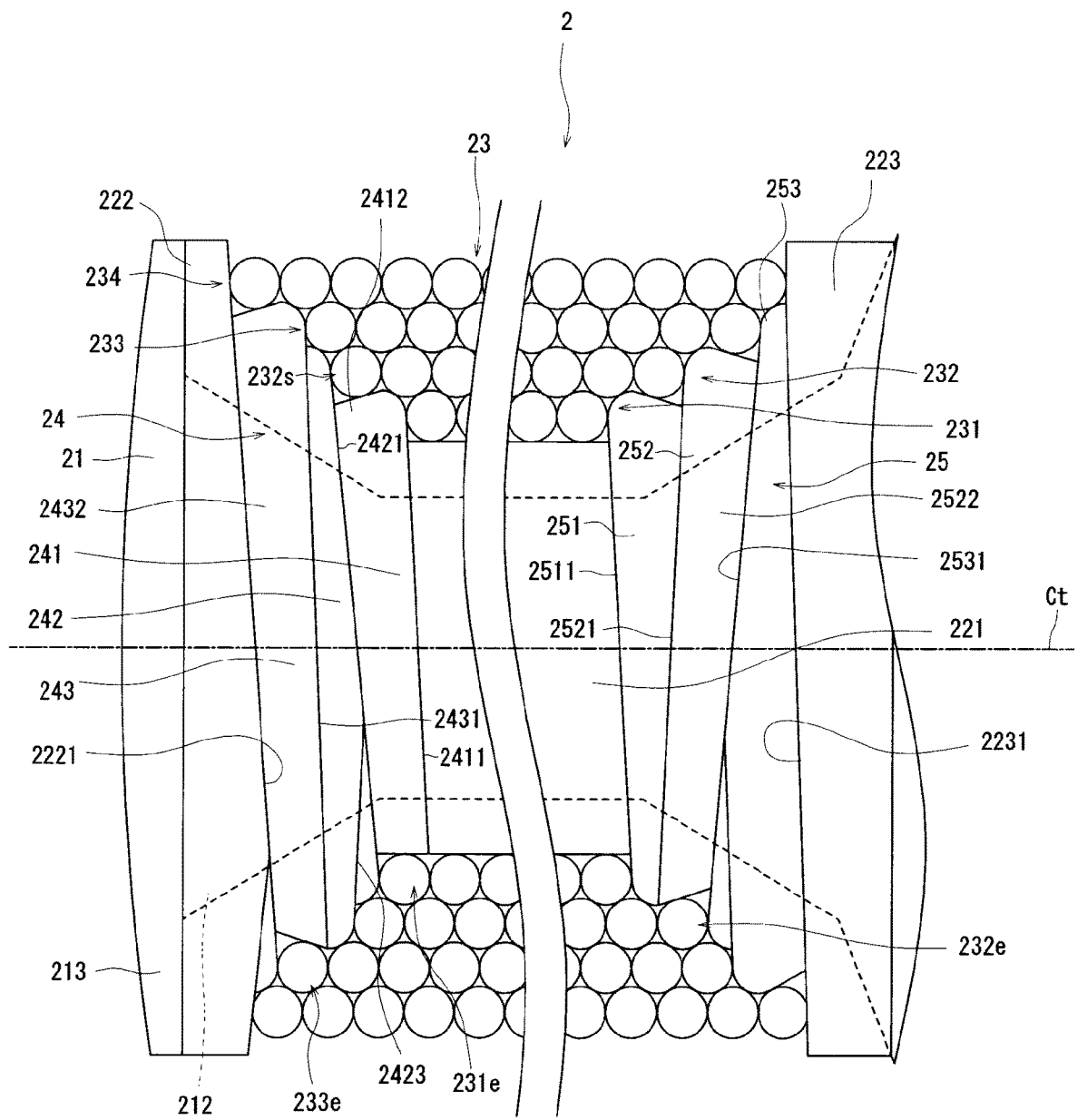
FIG. 3 is a plan view showing a coil provided in one of teeth parts of the stator.
Figure 4:
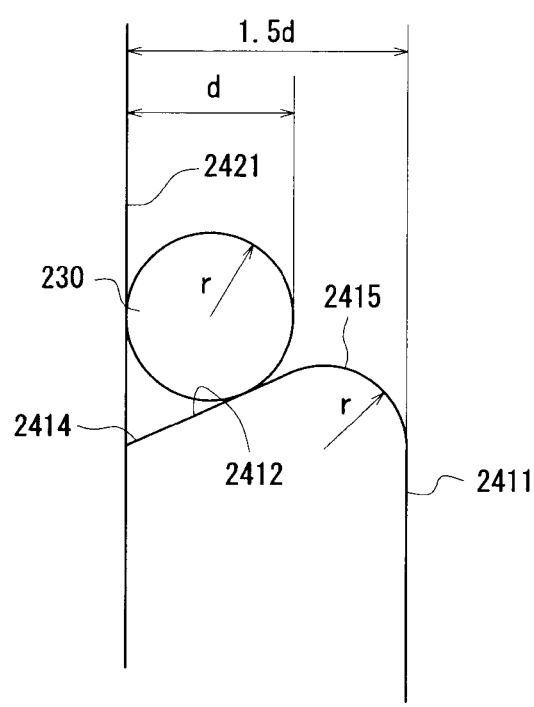
FIG. 4 is a schematic view showing a shape of a slope part.
Figure 5:
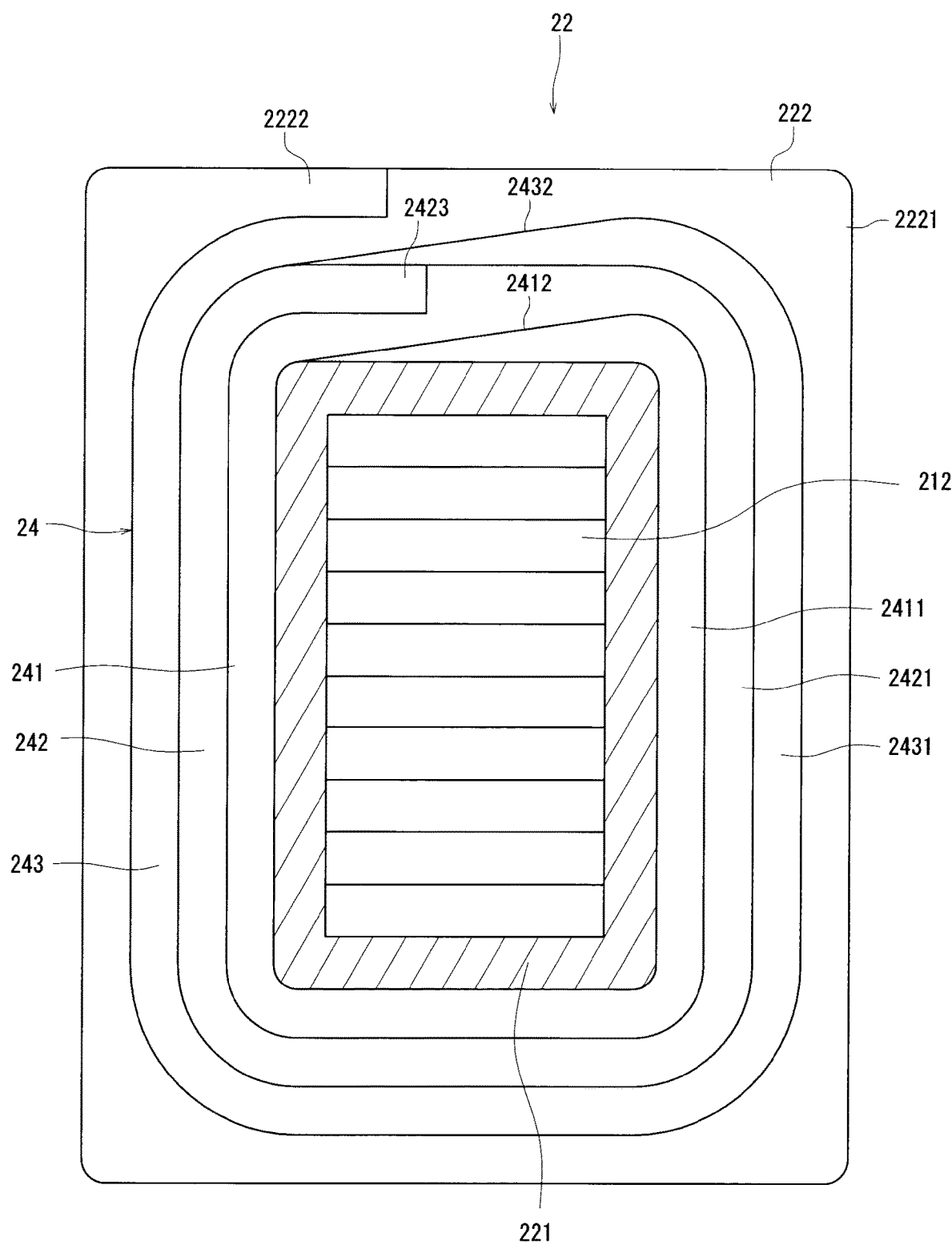
FIG. 5 is a cross-sectional view of an outer side flange part of an insulator as viewed from the radial direction.
Figure 6:
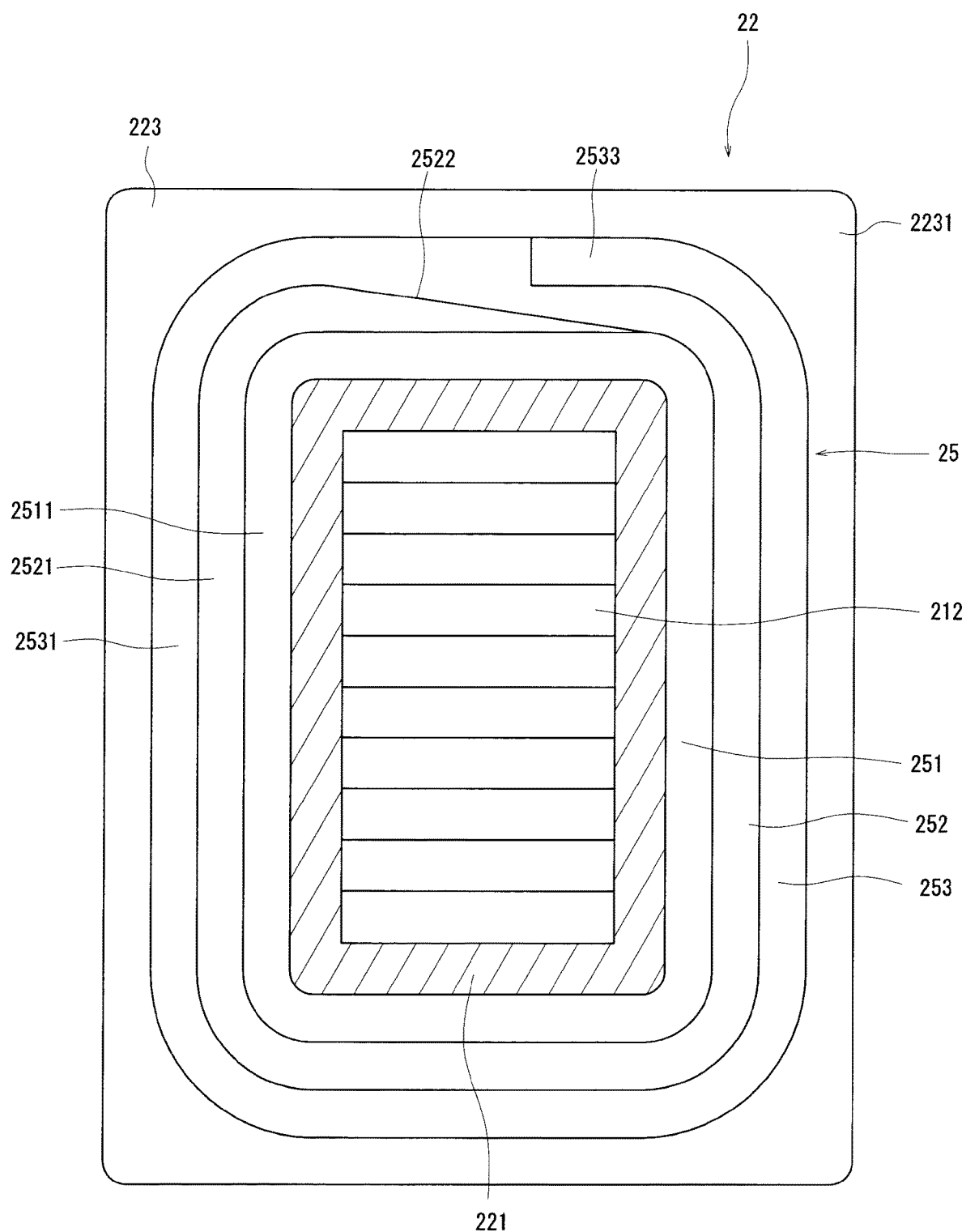
FIG. 6 is a cross-sectional view of an inner side flange part of the insulator as viewed from the radial direction.
Figure 7:
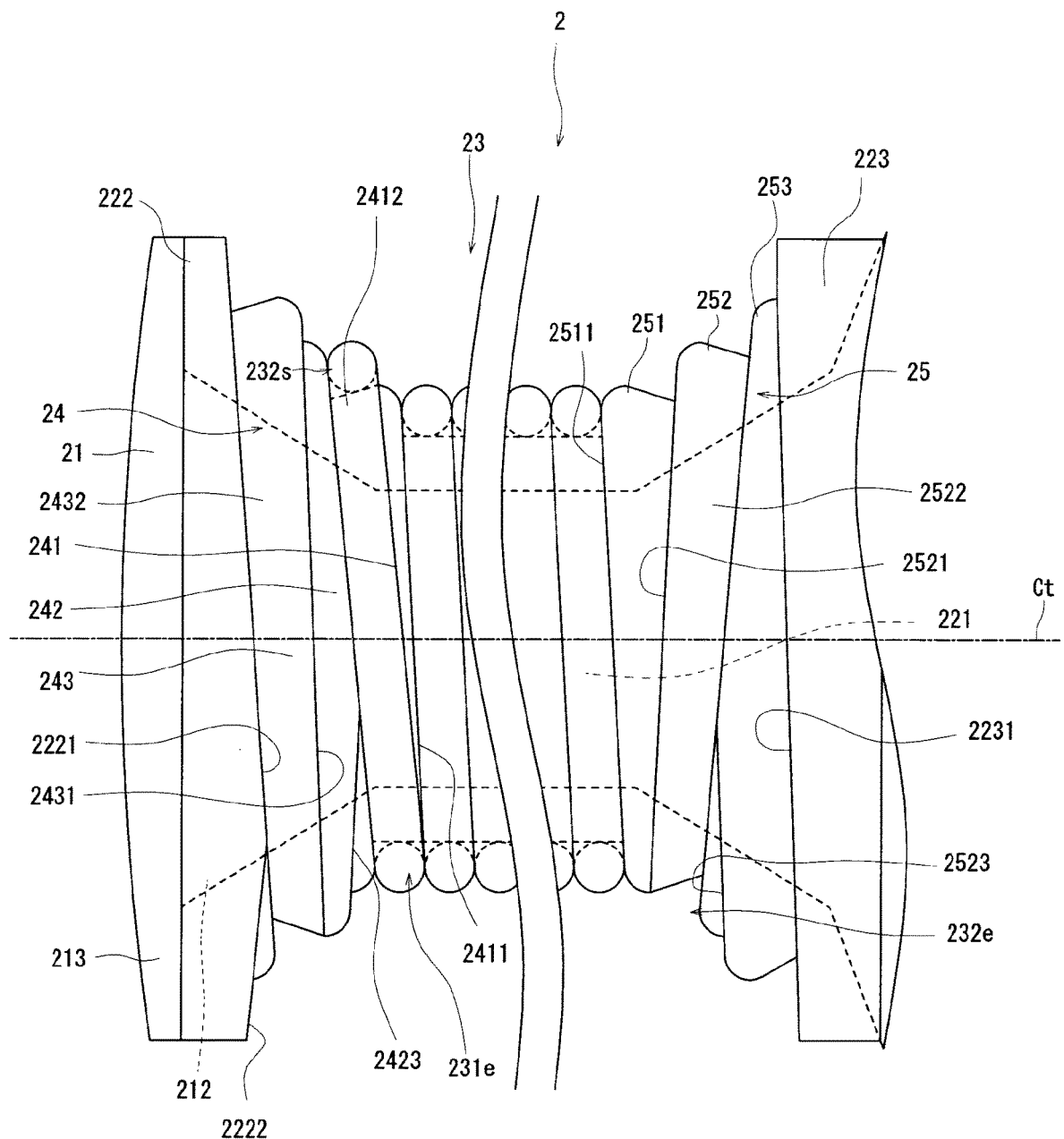
FIG. 7 is a plan view showing a wound state of a first winding layer of the coil.
Figure 8:
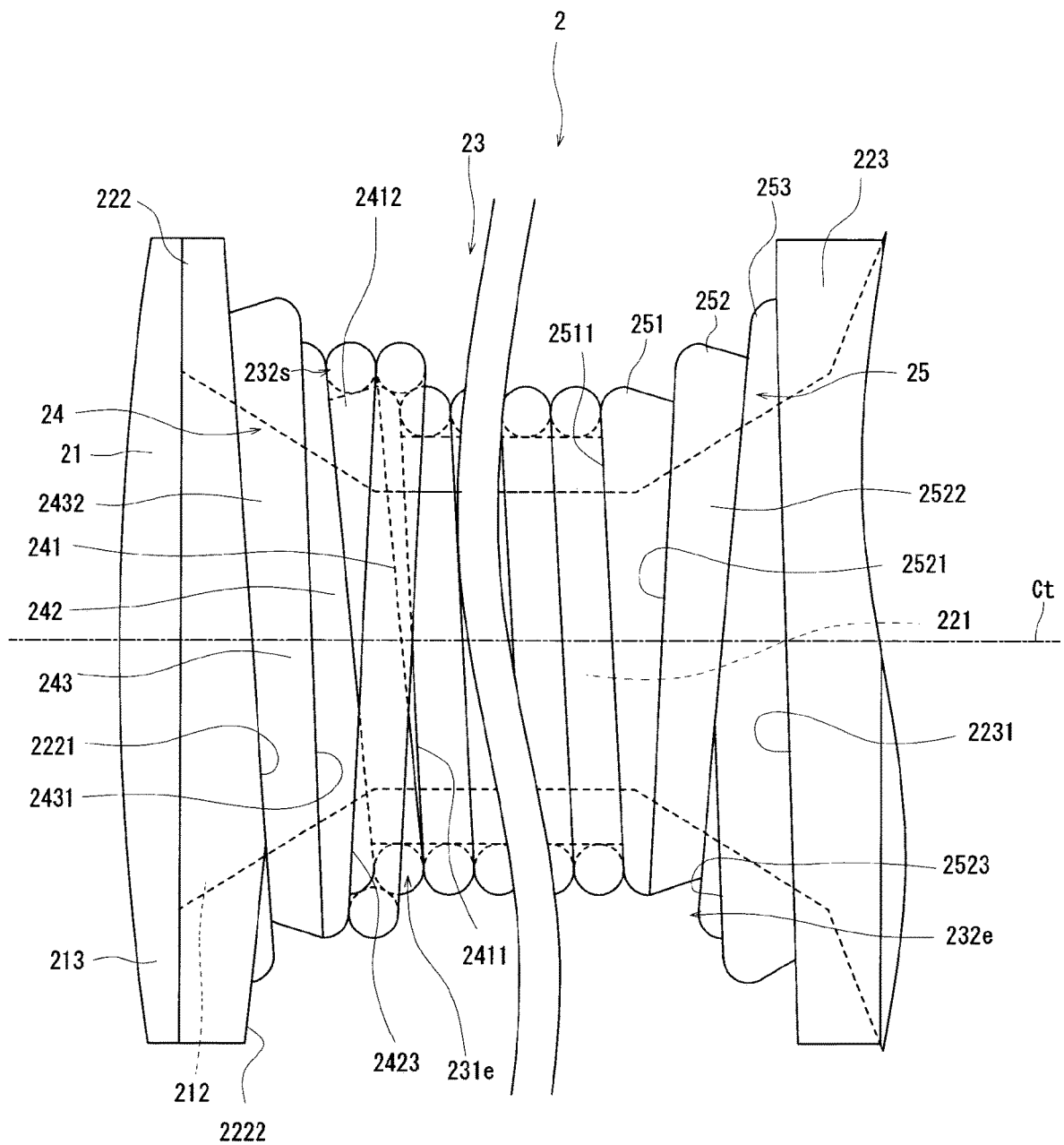
FIG. 8 is a plan view showing a winding start state of a second winding layer.

Next, the stator 2 will be described with reference to the drawings. FIG. 3 is a plan view showing a coil 23 provided in one of teeth parts 212 of the stator 2. FIG. 4 is a schematic view showing a shape of a first slope part 2412. FIG. 5 is a cross-sectional view of an outer side flange part 222 of an insulator 22 as viewed from the radial direction. FIG. 6 is a cross-sectional view of an inner side flange part 223 of the insulator 22 as viewed from the radial direction. FIG. 7 is a plan view showing a wound state of a first winding layer 231 of the coil 23. FIG. 8 is a plan view showing a winding start state of a second winding layer 232.

The stator 2 faces the rotor 1 in the radial direction. The stator 2 is an armature that causes generation of a magnetic flux according to a driving current. As shown in FIG. 2 and FIG. 3, the stator 2 includes the stator core 21, the insulator 22, and the coil 23.

<4.2.1 Regarding the Stator Core 21>

The stator core 21 is a magnetic body. The stator core 21 is configured, for example, by laminating electromagnetic steel plates in the axial direction. The stator core 21 includes a core back part 211 in a cylindrical shape extending along the central axis Cx and a plurality of teeth parts 212. As shown in FIG. 2, the core back part 211 in an annular shape is fixed to the supporting column 100 while the supporting column 100 is inserted into a through hole provided in the central part. For example, the supporting column 100 is fixed to the through hole by press fitting. However, the fixing of the core back part 211 to the supporting column 100 is not limited to press fitting, and a wide range of methods, such as adhesion or welding, that can reliably fix the core back part 211 to the supporting column 100 can be used.

As shown in FIG. 2 and FIG. 3, the plurality of teeth parts 212 protrude from the core back part 211 toward the radial-direction outer side. That is, the stator core 21 includes a core back part 211 which is in a cylindrical shape extending vertically along the central axis Cx and the plurality of teeth parts 212 which extend from the core back part 211 in the radial direction. The radial-direction outer side surfaces of the plurality of teeth parts 212 face the radial-direction inner surface of the rotor 1 in the radial direction (with reference to FIG. 2 and the like). Further, as shown in FIG. 3, a pressing part 213 that expands in a direction orthogonal to a central line Ct of the teeth part 212 is provided at the radial-direction outer side edge part of the teeth part 212. The pressing part 213 contacts the outer side flange part 222 (to be described later) of the insulator 22 and is used for positioning the insulator 22.

<4.2.2 Regarding the Coil 23>

The coil 23 is formed by winding a conductive wire 230 around the teeth parts 212 surrounded by the insulator 22. The coil 23 is magnetically excited by a current supplied to the conductive wire 230. In the motor 200, the rotor 1 is rotated by the attractive force and the repulsive force of the coil 23 and the rotor magnet 13.

Here, though not shown in the drawings, the conductive wire 230 is in a shape in which a core wire is covered with a coating. Therefore, the outer diameter of the conductive wire 230 is an outer diameter including the coating that covers the outer surface of the core wire. The coil 23 includes, from the side close to the insulator 22, the first winding layer 231, the second winding layer 232, a third winding layer 233, and a fourth winding layer 234 (with reference to FIG. 3). That is, the coil 23 is formed by winding the conductive wire 230 on the outer surface of the insulator 22 in layers to laminate a plurality of winding layers 231, 232, 233, 234. Further, in the embodiment, the coil 23 is configured to include four winding layers, but it is not limited to four layers.

As shown in FIG. 3 and FIG. 7, the first winding layer 231 is wound in contact with the radial-direction outer side of the conductive wire 230 that has already been wound. Further, winding the conductive wire 230 beside the already wound conductive wire 230 is referred to as forward-winding the conductive wire 230. That is, the conductive wire 230 of the first winding layer 231 is forward-wound from the radial-direction inner side toward the radial-direction outer side.

In addition, after the conductive wire 230 of the first winding layer 231 reaches a winding end part 231e at the radial-direction outer side end part, it is forward-wound toward the radial-direction inner side while being wound on the upper part of the first winding layer 231. That is, at the radial-direction outer end, the conductive wire 230 is wound on the outer side of the first winding layer 231 and returned and forward-wound toward the radial-direction inner side to form the second winding layer 232. That is, at the part closer to the radial-direction outer side than the winding end part 231e, the second winding layer 232 starts to be wound by winding the conductive wire 230 on the upper part of the first winding layer 231, and returned and forward-wound toward the radial-direction inner side to form the second winding layer 232. Similarly, the third winding layer 233 and the fourth winding layer 234 are also formed by returning at a winding end part 232e of the second winding layer 232 and a winding end part 233e of the third winding layer 233 and forward-winding the conductive wire 230. That is, the first winding layer 231 and the third winding layer 233 are forward-wound from the radial-direction inner side to the radial-direction outer side. Further, the second winding layer 232 and the fourth winding layer 234 are forward-wound from the radial-direction outer side to the radial-direction inner side.

<4.2.3 Regarding the Insulator 22>

The insulator 22 is formed by an insulating material such as resin. As shown in FIG. 2 and FIG. 3, the insulator 22 covers at least a part of the teeth part 212. The insulator 22 includes a cylindrical-shaped part 221, the outer side flange part 222, the inner side flange part 223, an outer side contact part 24, and an inner side contact part 25. That is, the insulator 22 includes a cylindrical-shaped part 221 which is in a cylindrical shape and covers the teeth part 212, the flange parts 222, 223 which are provided at two ends of the cylindrical-shaped part 221 across the coil and expand in a direction intersecting the radial direction, and the contact parts 24, 25 which are on the coil side of the flange parts 222, 223 and contact each of the winding layers 231, 232, 233, 234 in the radial direction.

The cylindrical-shaped part 221 surrounds a part of the teeth part 212 in a rectangular parallelepiped shape. The cylindrical-shaped part 221 is a cylindrical body having a rectangular cross section. The outer side flange part 222 is connected to the radial-direction outer side of the cylindrical-shaped part 221. The radial-direction outer side surface of the outer side flange part 222 contacts the pressing part 213 of the teeth part 212. Further, the outer side flange part 222 contacts the pressing part 213, whereby the insulator 22 is positioned. In addition, the inner side flange part 223 is connected to the radial-direction inner side of the cylindrical-shaped part 221. The inner side flange part 223 surrounds the teeth part 212, and the inner side surface of the inner side flange part 223 contacts the core back part 211. Further, a part of the inner side flange part 223 surrounds a part of the core back part 211.

As shown in FIG. 3, the outer side contact part 24 is disposed on the radial-direction inner side of the outer side flange part 222. In the outer side contact part 24, a first outer side contact part 241, a second outer side contact part 242 and a third outer side contact part 243 are formed sequentially from the radial-direction inner side toward the radial-direction outer side. In addition, the lamination-direction lengths of the winding layers increase along this sequence.

The inner side contact part 25 is disposed on the radial-direction outer side of the inner side flange part 223. In the inner side contact part 25, a first inner side contact part 251, a second inner side contact part 252 and a third inner side contact part 253 are formed sequentially from the radial-direction outer side toward the radial-direction inner side. In addition, the lamination-direction lengths of the winding layers increase along this sequence.

The radial-direction inner side end part of the first winding layer 231 contacts a first inner side contact surface 2511 of the first inner side contact part 251 facing the radial-direction outer side, and the radial-direction outer side end part of the first winding layer 231 contacts a first outer side contact surface 2411 of the first outer side contact part 241 facing the radial-direction inner side. Similarly, the radial-direction inner side end part of the second winding layer 232 contacts a second inner side contact surface 2521 of the second inner side contact part 252 facing the radial-direction outer side, and the radial-direction outer side end part of the second winding layer 232 contacts a second outer side contact surface 2421 of the second outer side contact part 242 facing the radial-direction inner side. The radial-direction inner side end part of the third winding layer 233 contacts a third inner side contact surface 2531 of the third inner side contact part 253 facing the radial-direction outer side, and the radial-direction outer side end part of the third winding layer 233 contacts a third outer side contact surface 2431 of the third outer side contact part 243 facing the radial-direction inner side. The radial-direction inner side end part of the fourth winding layer 234 contacts an inner side flange part contact surface 2231 of the inner side flange part 223 facing the radial-direction outer side, and the radial-direction outer side end part of the fourth winding layer 234 contacts an outer side flange part contact surface 2221 of the outer side flange part 222 facing the radial-direction inner side.

In addition, as shown in FIG. 3 and FIG. 5, the upper surface of the first outer side contact part 241 includes the first slope part 2412 in which the rear of the conductive wire 230 is inclined toward the upper side. In the first slope part 2412, the rear of the conductive wire 230 in the winding direction is inclined toward the upper side. That is, the first outer side contact part 241 includes the first slope part 2412 which is inclined in the lamination direction of the first winding layer 231 with respect to the winding direction of the conductive wire 230, and guides the conductive wire 230 from the winding end part 231e of the first winding layer 231 to a winding start part 232s of the subsequent second winding layer 232.

As shown in FIG. 4, the upper surface of the first slope part 2412 includes a first slope groove part 2414. The first slope groove part 2414 is an inclined surface which is inclined toward the lower side as it goes toward the radial-direction outer side. That is, the first slope part 2412 includes the first slope groove part 2414 in which the conductive wire 230 is disposed. And the first slope groove part 2414 is inclined toward the inner side in the lamination direction of the first winding layer 231 as it goes toward the side of the outer side flange part 222 where the first slope part 2412 is provided. Further, the first slope groove part 2414 is not limited to an inclined surface as long as it is in a shape into which the conductive wire 230 can be fitted.

Moreover, the rear end part, in the winding direction of the conductive wire 230, of the first slope part 2412 is 1.5 times an outer diameter d of the conductive wire 230 (with reference to FIG. 4). That is, the maximum width of the first slope part 2412 in the direction in which the outer side flange part 222 and the inner side flange part 223 face each other is 1.5 times the diameter of the conductive wire. In addition, 1.5 times the outer diameter d of the conductive wire 230 includes not only exactly 1.5 times but may be slightly deviated.

Further, a corner part 2415 at the rear end part, in the winding direction of the conductive wire 230, of the first slope part 2412 is formed by a curved surface having the same radius of curvature as the outer diameter d of the conductive wire 230. That is, in the part of the first slope part 2412 that reaches the subsequent second winding layer 232, the corner part of the flange part (the inner side flange part 223) far from the first slope part 2412 has a curved surface with the same radius of curvature as the radius of the conductive wire.

In addition, the upper surface of the third outer side contact part 243 also includes a third slope part 2432 in which the rear of the conductive wire 230 is inclined toward the upper side. In the third slope part 2432, the rear of the conductive wire 230 in the winding direction is inclined toward the upper side. The third slope part 2432 connects the winding end of the third winding layer 233 to the winding start of the fourth winding layer 234. The upper surface of the third slope part 2432 includes a slope groove part (not shown) configured similarly to the first slope part 2412.

On the radial-direction inner surface of the second outer side contact part 242, a first guide surface 2423 is provided in which the rear side of the conductive wire 230 in the winding direction is directed to the radial-direction inner side. The first guide surface 2423 guides the conductive wire 230 of the second winding layer 232 next to the conductive wire 230 at the winding start. In addition, on the radial-direction inner surface of the outer side flange part 222, a third guide surface 2223 is provided in which the rear side of the conductive wire 230 in the winding direction is directed to the radial-direction inner side. The third guide surface 2223 guides the conductive wire 230 of the fourth winding layer 234 next to the conductive wire 230 at the winding start.

Further, the side surfaces and the lower surfaces of the first outer side contact part 241, the second outer side contact part 242, and the third outer side contact part 243 respectively have surfaces parallel to the side surfaces and the lower surface of the cylindrical-shaped part 221 (with reference to FIG. 5).

In addition, as shown in FIG. 3 and FIG. 6, the upper surface of the second inner side contact part 252 includes the second slope part 2522 in which the rear of the conductive wire 230 is inclined toward the upper side. In the second slope part 2522, the rear of the conductive wire 230 in the winding direction is inclined toward the upper side. The second slope part 2522 connects the winding end of the second winding layer 232 to the winding start of the third winding layer 233. The upper surface of the second slope part 2522 includes a slope groove part (not shown) configured similarly to the first slope part 2412.

On the radial-direction outer surface of the third inner side contact part 253, a second guide surface 2533 is provided in which the rear side of the conductive wire 230 in the winding direction is directed to the radial-direction outer side. Further, the side surfaces and the lower surfaces of the first inner side contact part 251, the second inner side contact part 252, and the third inner side contact part 253 respectively have surfaces parallel to the side surfaces and the lower surface of the cylindrical-shaped part 221 (with reference to FIG. 6).

Next, a procedure for winding the conductive wire 230 on the insulator 22 will be described with reference to the drawings. The conductive wire 230 wound on the coil 23 starts to be wound from the lower part of the insulator 22 and from the radial-direction inner side. That is, the conductive wire 230 starts winding in contact with the first inner side contact surface 2511 of the first inner side contact part 251. Then, the conductive wire 230 is wound toward the radial-direction outer side in contact with the conductive wire 230 already wound. In this way, the first winding layer 231 is formed.

When the conductive wire 230 reaches the radial-direction outer-side end part of the first winding layer 231, the first winding layer 231 ends winding. Then, after the winding end part 231e of the first winding layer 231 reaches the upper part, the conductive wire 230 is wound on the first slope part 2412 (with reference to FIG. 7). When the conductive wire 230 is wound on the first slope part 2412, by disposing the conductive wire 230 in the first slope groove part 2414, the position variation of the conductive wire 230 can be suppressed. In this way, the winding disorder of the coil 23 can be suppressed.

In addition, by forming the first slope groove part 2414 as an inclined surface that is inclined toward the central line Ct side as it goes toward the radial-direction outer side, when the winding force is applied on the conductive wire 230, the conductive wire 230 is pressed against the second outer side contact surface 2421 of the second outer side contact part 242 on the outer flange part 222 side (with reference to FIG. 4). In this way, even when the wire diameter of the conductive wire varies and the position of the winding end part 231e of the first winding layer 231 varies, the winding start part 232s of the subsequent second winding layer 232 can be set to an accurate position, that is, to a predetermined position. In this way, the winding disorder of the coil 23 can be suppressed.

Further, even when the outer diameter of the conductive wire 230 varies, the winding start position of the subsequent winding layer can be set to the same position. In this way, the winding disorder of the coil 23 can be suppressed.

Then, the conductive wire 230 is wound in contact with the second outer side contact surface 2421. And then, the conductive wire 230 wound on the upper side is wound along the first guide surface 2423, and is wound toward the radial-direction inner side of the winding start part 232s of the second winding layer 232 (with reference to FIG. 8).

At this time, the winding start part 232s of the second winding layer 232 is disposed closer to the side of the outer side flange part 222 than the winding end part 231e of the immediately preceding first winding layer 231. That is, compared with the conductive wire at the winding end part 231e of the preceding and first winding layer 231, the winding start of the subsequent and second winding layer 232 is disposed closer to a side of the outer side flange part 222 which contacts the outer side contact part 24 contacted by the conductive wire 230. Therefore, the start position of the winding layers of the second and subsequent winding layers is set closer to the side of the outer side flange part 222 than the end position, whereby the intersection position of the conductive wire 230 can be set to the side of the outer side flange part 222. In this way, the winding disorder of the coil 23 caused by the intersection of the conductive wire 230 can be suppressed.

In addition, the maximum width of the first slope part 2412 in the radial direction is set to 1.5 times, whereby the position of the conductive wire 230 after the conductive wire 230 is returned and overlapped at the subsequent second winding layer 232 can be accurately determined. In this way, the winding disorder of the coil 23 can be suppressed.

At this time, the conductive wire 230 is wound in contact with the curved surface of the corner part 2415 of the first slope part 2412 (with reference to FIG. 8). That is, in the part of the first slope part 2412 that reaches the subsequent second winding layer 232, the corner part on the side opposite to the flange part is set to be a curved surface with the same radius of curvature as the radius of the conductive wire, whereby the returned conductive wire 230 can be supported by the curved surface of the corner part. In this way, the winding disorder of the coil 23 can be further suppressed.

Further, as shown in FIG. 8, the conductive wire of the second winding layer 232 intersects the conductive wire 230 of the first winding layer 231 at the first slope part 2412. That is, the conductive wire 230 at the winding start of the second and subsequent winding layers 232, 233, 234 intersects the conductive wire 230 at the winding end of the preceding winding layers 231, 232, 233 on the slope parts 2412, 2522, 2432 in the lamination direction. The conductive wire 230 is overlapped on the slope parts 2412, 2522, 2432, whereby the height of the conductive wire 230 in the lamination direction can be suppressed. Further, the conductive wire can be accurately disposed next to the winding start position. In this way, the winding disorder of the coil 23 can be suppressed.

The rear end part, in the winding direction of the conductive wire 230, of the first slope part 2412 is 1.5 times the outer diameter of the conductive wire 230. Further, the corner part 2415 at the rear end part in the winding direction of the conductive wire 230 is formed by a curved surface having the same curvature as the outer diameter of the conductive wire 230. As a result, when returned from the first winding layer 231 toward the second winding layer 232, it is possible to suppress the winding disorder caused by the conductive wire 230 of the second winding layer 232 being embedded between the conductive wire 230 of the first winding layer 231, or the conductive wire 230 being excessively overlapped. Similarly, the rear end parts of the slope parts 2412, 2522, 2432 in the winding direction is 1.5 times the outer diameter of the conductive wire 230. Further, the corner part 2415 at the rear end part in the winding direction of the conductive wire 230 is formed by a curved surface having the same curvature as the outer diameter of the conductive wire 230.

In addition, similarly, the slope parts 2522, 2432 are also used in the part returned from the second winding layer 232 to the third winding layer 233 and the part returned from the third winding layer 233 to the fourth winding layer 234, whereby the winding starts of the third winding layer 233 and the fourth winding layer 234 can be started from accurate positions. Further, the radius of curvature of the corner part 2415 of the first slope part 2412 on the side opposite to the outer side flange part 222 is set to be the same as the radius r of the conductive wire 230, whereby the returned conductive wire 230 can be disposed at a more accurate position. In this way, the winding disorder of the winding can be further suppressed.

That is, by providing the slope parts 2412, 2522, 2432 that are inclined from the winding end parts of certain winding layers 231, 232, 233 toward the winding start parts of the subsequent winding layers 232, 233, 234, the conductive wire 230 can be wound at the accurate positions of the subsequent winding layers 232, 233, 234. In this way, the winding disorder of the coil 23 can be suppressed. Further, when starting winding the subsequent winding layers 232, 233, 234, since it can be started from accurate positions, it is possible to suppress winding disorder caused by position variations at the time of returning from the preceding winding layers 231, 232, 233 due to variations in the outer diameter of the conductive wire 230 and the like. In this way, the magnetic characteristics of the motor 200 can be improved, and the output can be improved. This can reduce the electric power required to obtain the same output; that is, it can reduce the electric power consumption.

Further, in the insulator 22 of the embodiment, it is configured that the slope parts 2412, 2432, 2522 are provided on the upper surfaces of the contact parts 24, 25, but the disclosure is not limited thereto. For example, they may be provided on the lower surfaces. That is, the slope parts 2412, 2432, 2522 may be provided on at least one of the upper surfaces and the lower surfaces of the contact parts 24, 25. Therefore, by providing the slope parts 2412, 2432, 2522 on the upper surface or the lower surface of the insulator 22, the return surface of each of the winding layers 231, 232, 233 can be easily formed, and the winding disorder can be easily suppressed. Further, for example, when the insulator 22 is molded by a mold, since a mold that opens on the upper and lower sides can be used, mold production can be easy, and the insulator 22 can be easily manufactured.

<4.2.4 Regarding a Modified Example>

Figure 9:
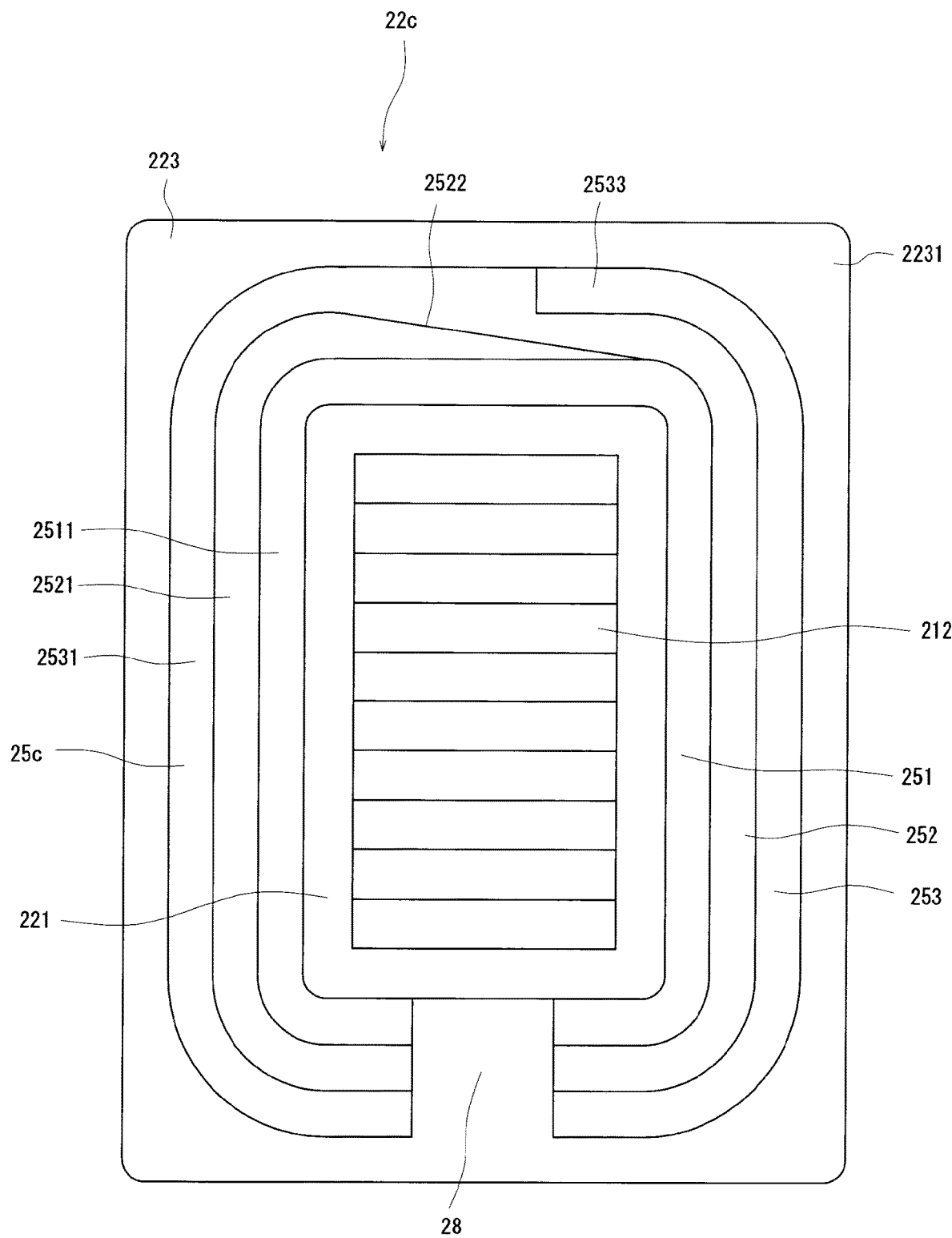
FIG. 9 is a schematic view of an inner side contact part of another example of an insulator according to the disclosure.

An insulator 22c of a modified example of the embodiment will be described with reference to the drawings. FIG. 9 is a schematic view of an inner side contact part 25c of another example of an insulator according to the disclosure. As shown in FIG. 9, the insulator 22c includes a concave part 28 that is recessed on the lower surface of the inner side contact part 25c toward the upper side and extends in the radial direction. Except for this point, the configuration of the insulator 22c is the same as that of the insulator 22. The parts in which the insulator 22c is substantially the same as the insulator 22 are denoted by the same reference numerals, and detailed descriptions of the same parts are omitted.

As shown in FIG. 9, the inner side contact part 25c includes, on at least one of the upper surface and the lower surface, the concave part 28 that is recessed toward the inner side in the lamination direction of the winding layers 231, 232, 233, 234 and extends in the radial direction. In this way, it is possible to start winding the coil 23 easily. Further, since the concave part 28 is formed on the upper surface or the lower surface, when the insulator 22c is a molded body formed by using a mold, mold production can be easy. Therefore, the manufacturing cost of the insulator 22c can be reduced.

Further, for example, a winding start part of the conductive wire 230 forming the coil 23 is disposed in the concave part 28. That is, at least one of the conductive wire 230 on the winding start side and the conductive wire 230 on the winding end side of the coil 23 is disposed in the concave part 28. When the conductive wire 230 at the winding start is disposed in the concave part 28, the winding disorder of the conductive wire 230 at the winding start can be suppressed. Further, when the conductive wire 230 at the winding end is disposed in the concave part 28, the conductive wire 230 can be easily collected, and the stator 2 can be easily manufactured.

As shown in FIG. 2, the rotor 1 is attached to the rotor attachment part 307 of the impeller housing 301. In addition, the attachment of the rotor 1 to the rotor attachment part 307 may be fixed by press-fitting the rotor housing 12 into the rotor attachment cylinder part 309 of the rotor attachment part 307, or may be fixed by a fixing method such as adhesion or welding.

Then, after the circuit board 40 is attached to the base part 101 of the supporting column 100, the stator 2 is attached to the supporting column 100. Then, the impeller housing 301 is attached to the supporting column 100, to which the stator 2 and the circuit board 40 are attached, via the bearings 3 in a rotatable state. At this time, the rotor magnet 13 faces the teeth parts 212 of the stator 2 in the radial direction.

The motor according to the disclosure can be widely used not only in an air blowing device but also as a power source for rotating a rotating body.

The embodiments of the disclosure have been described above, but the disclosure is not limited to the above contents. Further, various modifications can be added to the embodiments of the disclosure without departing from the spirit of the disclosure.

INDUSTRIAL APPLICABILITY

The air blowing device of the disclosure can be used for a circulator. Further, for example, it can be used as a power source for an unmanned air vehicle. In addition to this, the disclosure can be widely applied to machines which use an airflow that generates an axial flow. Moreover, the motor of the disclosure can be used as a power source which supplies a rotational force to the outside other than to an air blowing device.

What is claimed is:

1. A stator, comprising:
   a stator core which comprises:
      a core back which is in a cylindrical shape extending vertically along a central axis; and
      a plurality of teeth which extend from the core back in a radial direction;
   an insulator which covers at least a part of the teeth; and
   a coil which is formed by winding a conductive wire on an outer surface of the insulator to laminate a plurality of winding layers,
   wherein the insulator comprises:
      a cylindrical-shaped part which is in a cylindrical shape with the conductive wire wound in a vertical direction and a circumferential direction of the teeth;
      a flange part which is provided at two ends of the cylindrical-shaped part across the coil in the radial direction and expands in a lamination direction of the winding layers; and
      a contact part which is on the cylindrical-shaped part side of the flange part and contacts each of the winding layers in the lamination direction, and
   the contact part comprises a slope part which is inclined in the lamination direction of the winding layers with respect to a winding direction of the conductive wire and guides the conductive wire from a winding end part of a certain one of the winding layers to a winding start part of a subsequent one of the winding layers.

2. The stator according to claim 1, wherein the slope part is provided on at least one of an upper surface and a lower surface of the contact part.

3. The stator according to claim 1, wherein a maximum width of the slope part in the radial direction is 1.5 times an outer diameter of the conductive wire.

4. The stator according to claim 1, wherein in a part of the slope part that reaches a subsequent one of the winding layers, a corner part on a side opposite to the flange part has a curved surface with a same radius of curvature as a radius of the conductive wire.

5. The stator according to claim 1, wherein the slope part comprises a slope groove part in which the conductive wire is disposed.

6. The stator according to claim 5, wherein the slope groove part comprises an inclined surface which is inclined toward an inner side in the lamination direction of the winding layers as the inclined surface goes toward the flange part side in contact with the contact part.

7. The stator according to claim 5, wherein the conductive wire at the winding start part of a second or subsequent one of the winding layers intersects the conductive wire at the winding end part of a preceding one of the winding layers in the lamination direction on the slope part.

8. The stator according to claim 7, wherein the conductive wire of a second or subsequent one of the winding layers before intersection of the conductive wire is disposed closer to the flange part side than the conductive wire at the winding end part of a preceding one of the winding layers.

9. The stator according to claim 1, wherein the contact part comprises, on at least one of an upper surface and a lower surface, a concave part which is recessed toward an inner side in the lamination direction of the winding layers and extends in the radial direction.

10. The stator according to claim 9, wherein at least one of the conductive wire on a winding start side and the conductive wire on a winding end side of the coil is disposed in the concave part.

11. A motor, comprising:
a stator, comprising: a stator core which comprises: a core back which is in a cylindrical shape extending vertically along a central axis; and a plurality of teeth which extend from the core back in a radial direction; an insulator which covers at least a part of the teeth; and a coil which is formed by winding a conductive wire on an outer surface of the insulator to laminate a plurality of winding layers, wherein the insulator comprises: a cylindrical-shaped part which is in a cylindrical shape with the conductive wire wound in a vertical direction and a circumferential direction of the teeth; a flange part which is provided at two ends of the cylindrical-shaped part across the coil in the radial direction and expands in a lamination direction of the winding layers; and a contact part which is on the cylindrical-shaped part side of the flange part and contacts each of the winding layers in the lamination direction, and the contact part comprises a slope part which is inclined in the lamination direction of the winding layers with respect to a winding direction of the conductive wire and guides the conductive wire from a winding end part of a certain one of the winding layers to a winding start part of a subsequent one of the winding layers; and
a rotor which faces the stator in a radial direction and is rotatable around a central axis that extends vertically.

12. An air blowing device, comprising:
a motor, comprising:
a stator, comprising:
a stator core which comprises: a core back which is in a cylindrical shape extending vertically along a central axis; and a plurality of teeth which extend from the core back in a radial direction; an insulator which covers at least a part of the teeth; and
a coil which is formed by winding a conductive wire on an outer surface of the insulator to laminate a plurality of winding layers, wherein the insulator comprises: a cylindrical-shaped part which is in a cylindrical shape with the conductive wire wound in a vertical direction and a circumferential direction of the teeth; a flange part which is provided at two ends of the cylindrical-shaped part across the coil in the radial direction and expands in a lamination direction of the winding layers; and a contact part which is on the cylindrical-shaped part side of the flange part and contacts each of the winding layers in the lamination direction, and the contact part comprises a slope part which is inclined in the lamination direction of the winding layers with respect to a winding direction of the conductive wire and guides the conductive wire from a winding end part of a certain one of the winding layers to a winding start part of a subsequent one of the winding layers;
a rotor which faces the stator in a radial direction and is rotatable around a central axis that extends vertically; and
an impeller fixed to the rotor.

* * * * *